April 24, 1928.
S. W. CADY
1,667,372
FOUR-HORSE HITCH
Filed Dec. 4, 1924
2 Sheets-Sheet 1
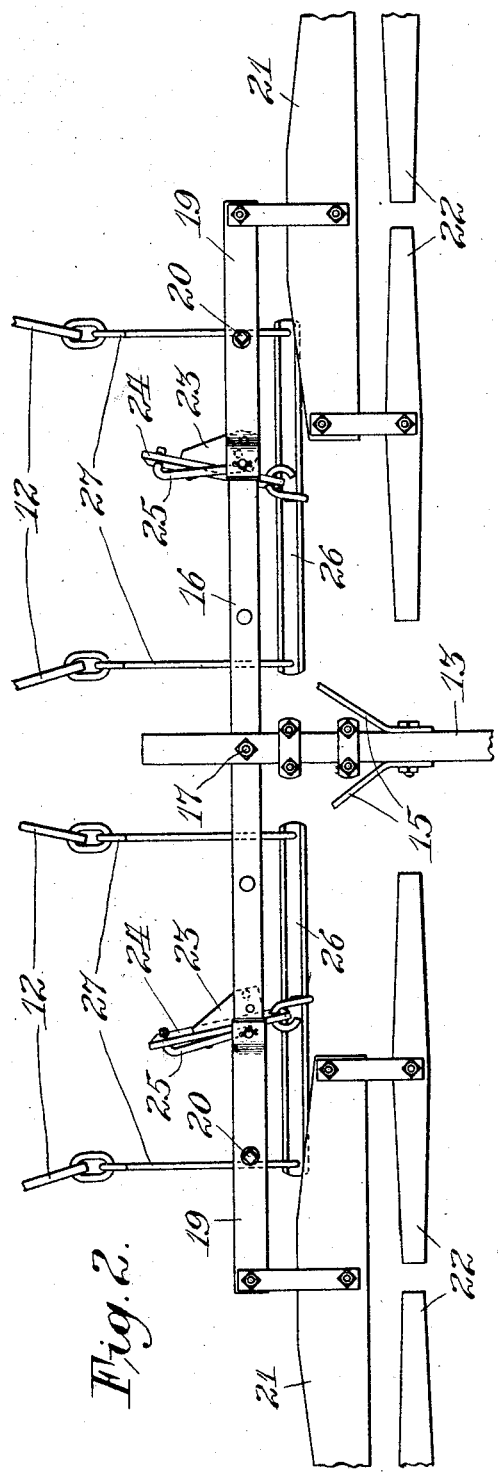
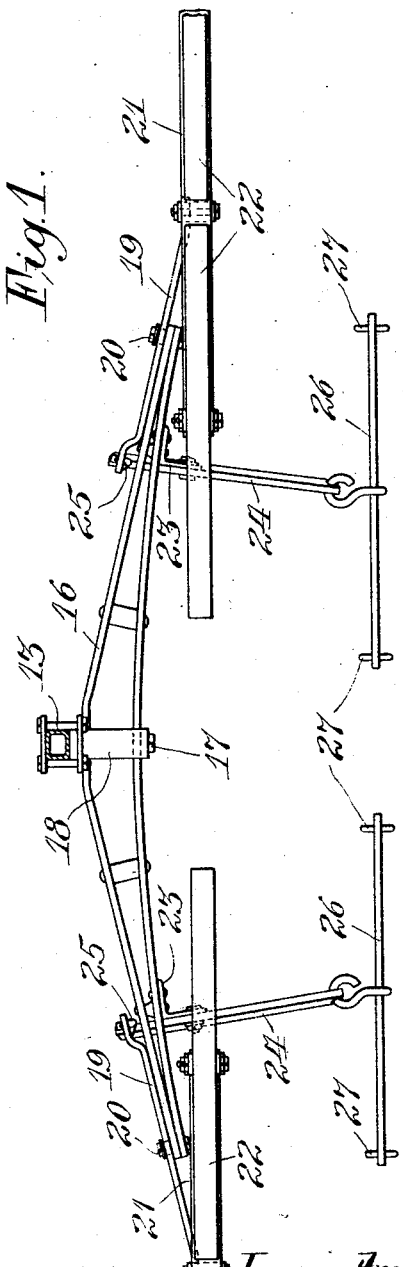
Inventor.
Sherman W. Cady,
By
Atty.

April 24, 1928.
S. W. CADY
1,667,372
FOUR-HORSE HITCH
Filed Dec. 4, 1924    2 Sheets-Sheet 2
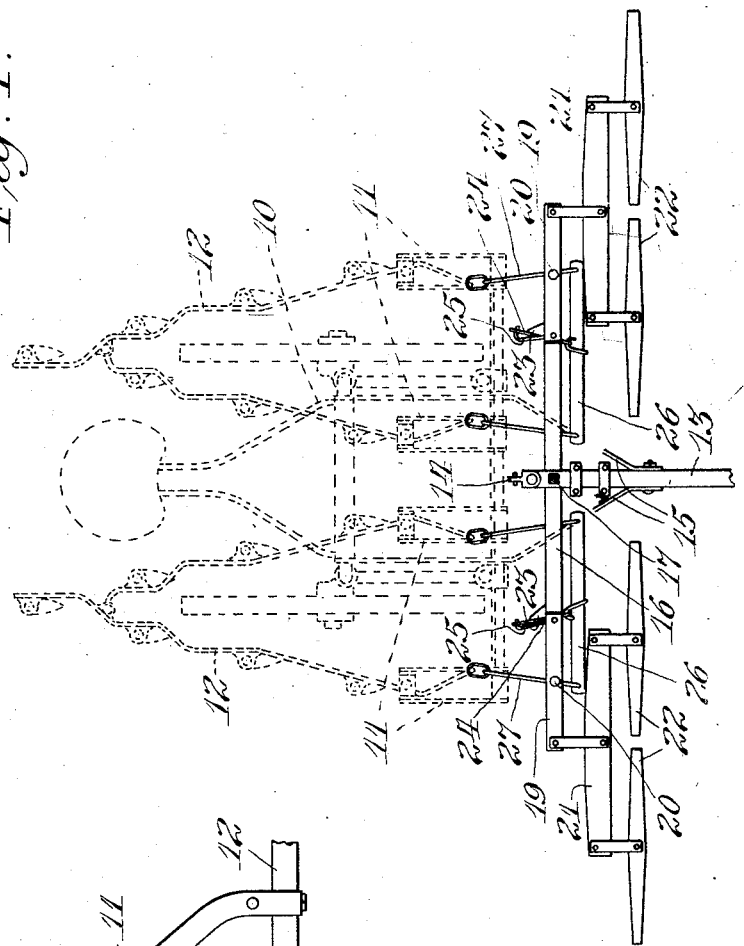
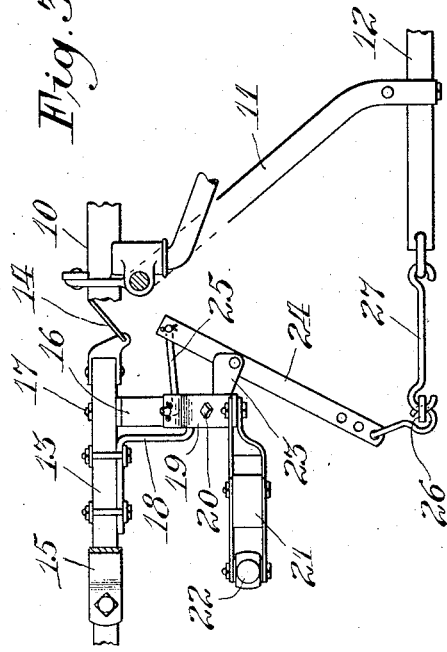
Inventor:
Sherman W. Cady,
By _____
Atty.

Patented Apr. 24, 1928.

1,667,372

UNITED STATES PATENT OFFICE.

SHERMAN W. CADY, OF HAMILTON, ONTARIO, CANADA, ASSIGNOR, BY MESNE ASSIGNMENTS, TO INTERNATIONAL HARVESTER COMPANY, OF CHICAGO, ILLINOIS, A CORPORATION OF NEW JERSEY.

FOUR-HORSE HITCH.

Application filed December 4, 1924. Serial No. 753,793.

This invention relates to draft appliances for cultivators and more particularly to wheeled cultivators of the kind having the tool carrying means suspended from the frame and surrounding each wheel.

The objects of the invention are to equalize the draft of several animals applied to the machine and to transmit a predetermined proportion of the draft power directly to the tool carrying means.

These main and other minor objects are attained by the novel construction and arrangement of parts, or mechanical equivalents thereof, described more fully in the following specification and defined in the claims.

Referring to the accompanying drawings,—

Fig. 1 is a front view of the draft rigging or hitch comprising the invention;

Fig. 2 is a plan view thereof;

Fig. 3 is a side view including parts of a cultivator on which the hitch is mounted; and Fig. 4 is a plan view showing the novel draft rigging in position on a cultivator, the principal parts of which are shown in broken lines.

In the present instance the draft device comprising the invention is shown on the drawings in combination with a cultivator of the type for which it is especially adapted, though not necessarily limited in its use to the one type shown. The cultivator shown comprises a wheeled frame 10 from which there depends four hangers 11 in which there are pivotally supported the forward ends of tool carrying beams 12, between each pair of which there is interposed one of the wheels of the cultivator frame in the manner clearly shown in Fig. 4. The usual draft tongue 13 is provided, the rear end of which is pivotally connected to the cultivator frame in any suitable manner, as at 14 (Fig. 3), and support for the tongue is provided by the frame members shown in section at 15.

The structure embodying the invention comprises a main equalizer bar 16 which is preferably of truss construction and slightly arched as seen in Fig. 1. This bar is pivotally supported at its center on a bolt 17 extending beneath the tongue and carried by a bracket 18. Each end of the main equalizer bar, or member 16, supports a draft connecting and transmitting organization, and, as both of these are identical in structure, only one of them will be described in detail. The organization referred to comprises a substantially horizontal draft lever 19, hereafter termed a primary draft lever, which is pivoted at its center on a bolt 20 on the end of the main equalizer bar 16 and extends outwardly beyond the same in parallel relation thereto. To the outer end of lever 19 there is connected a double tree 21 which carries the usual pair of swingletrees 22 for attachment of draft animals.

Behind the main bar 16 and at a point adjacent the inner ends of the primary draft lever 19 there is provided on said member a fulcrum bracket 23 which extends rearwardly and serves to pivotally support a substantially vertical secondary draft lever 24. The secondary draft lever 24 is positioned below the draft member 16 with its lower end depending to a point in advance of and substantially on a level with the tool beams 12 of the implement. The upper end of lever 24 is pivotally connected by a link 25 with the inner end of the primary draft lever 19 and on the lower end of the lever 24 there is loosely attached a secondary equalizer bar 26, the respective ends of which are connected by links 27 to the forward ends of a pair of implement carrying beams 12.

With the construction and arrangement above described it will be evident that draft force applied to the outer end of the primary draft lever 19 will be transmitted in part through link 25 as a thrust to the upper end of the secondary lever 24 causing it to swing on the fulcrum bracket 23 and tending to move its lower end forwardly thus applying a portion of the draft force to the forward ends of the tool beams 12. Suitable adjustment of the fulcrum point of secondary lever 24 on bracket 23 and of the connecting point of evener 26 on the lower end of lever 24 will serve to properly proportion the force so transmitted to the character of the soil being tilled.

The invention accordingly exemplifies an organization by which a portion of the draft force is transmitted through a main equalizer bar directly to the frame of an earth working implement and another portion of the draft force is transmitted directly to suspended tool beams on the frame through means including a system of levers carried on a main equalizer bar and arranged substantially at right angles to each other and pivotally connected together and to the tool beams, to certain of which levers the draft force is directly applied.

While the particular arrangement of elements here disclosed constitutes the preferred form of the invention it will be evident that certain variations in structure and arrangement of the parts comprising the device are possible without departure from the gist of the invention as defined in the following claims.

What is claimed as new is:

1. In a device of the class described, the combination of a main horizontally extending equalizer bar having a pivotal support at its center, substantially vertical draft levers pivoted between their ends near the respective ends of said bar, substantially horizontal draft levers also pivoted on said main equalizer bar each lever being link connected to the upper ends of the respective vertical levers, secondary equalizer bars carried by the lower ends of the vertical levers and provided with means for coupling them to an implement, and draft connecting means on the horizontal draft levers.

2. In a device of the class described, the combination of a pivoted main equalizer bar, primary draft levers pivoted on the outer portions of the equalizer bar, upright secondary draft levers also pivoted on the outer portions of said bar and angularly disposed with respect to the primary levers, link connections between the primary and secondary levers, secondary equalizer bars attached to the secondary levers at points remote from the link connections between said primary and secondary levers, draft couplings on the ends of the secondary equalizer bars, and draft hitches on the primary draft levers.

3. In a device of the class described, the combination of a main horizontally extending pivoted equalizer bar, upright draft levers pivoted between their ends near the respective ends of said bar and angularly disposed with respect thereto, means for applying the draft power to the upper ends of said levers, secondary equalizer bars connected to the lower ends of said levers, and means on said secondary bars for coupling them to an implement.

4. In draft devices for earth working implements having suspended tool beams; the combination of a main horizontally positioned draft member adapted to be connected to the frame of an implement, a primary draft lever pivoted on the end of said member and extending parallel thereto, a secondary draft lever pivoted between its ends on said draft member at a point behind the primary lever to swing in a substantially vertical plane, a link connecting the inner end of the primary lever with the upper end of the secondary lever, means on the lower end of the secondary lever for connecting it to the tool beams of an implement, and means for applying draft power to the outer end of the primary lever.

5. In a draft device for earth working implements having suspended tool beams; the combination of a main horizontally positioned draft member pivoted to the frame of the implement, a primary and a secondary draft lever each pivoted between its ends on said member with the secondary lever pivoted on a horizontal axis at right angles to the primary lever and depending below said main draft member, means pivotally connecting the upper end of the secondary lever with one end of the primary lever, means on the lower end of the secondary lever for connecting it to the tool beams of an implement, and means for applying draft power to the other end of the primary lever.

6. In a draft appliance for wheeled cultivators having a frame and tool carrying beams; a main equalizer bar pivotally supported intermediate its ends by the cultivator and a draft transmitting organization supported at each end of the equalizer bar; each draft transmitting organization comprising a substantially horizontal draft lever centrally pivoted on the equalizer bar, a doubletree connected to the outer end of the horizontal draft lever, a vertical draft lever pivotally supported intermediate its ends on the equalizer bar, a connection between the upper end of the vertical draft lever and the inner end of the horizontal lever, and connections between the lower end of the vertical lever and a cultivator beam.

In testimony whereof I affix my signature.

SHERMAN W. CADY.